United States Patent

[11] 3,622,54

[72] Inventors John Richard Caldwell;
George Joseph O'Neill, both of Kingsport, Tenn.
[21] Appl. No. 858,537
[22] Filed Sept. 16, 1969
[45] Patented Nov. 23, 1971
[73] Assignee Eastman Kodak Company
Rochester, N.Y.

[54] POLYTEREPHTHALAMIDES OF N-ARYL-SUBSTITUTED SHORT CHAIN DIAMINES
11 Claims, No Drawings

[52] U.S. Cl. .................................................. 260/78 R, 260/33.8 R
[51] Int. Cl. ........................................................ C08g 20/20
[50] Field of Search ........................................... 260/78, 78 SC

[56]  References Cited
UNITED STATES PATENTS

| | | | |
|---|---|---|---|
| 2,953,548 | 9/1960 | Schott et al. .................. | 260/ |
| 3,154,524 | 10/1964 | Martinek ...................... | 260/ |
| 3,297,656 | 1/1967 | Caldwell ...................... | 260/ |
| 3,418,275 | 12/1968 | Stephens ..................... | 260/ |
| 3,485,804 | 12/1969 | Kawabata et al. ............ | 260/ |

Primary Examiner—Harold D. Anderson
Attorneys—Cecil D. Quillen, Jr. and Charles L. Good ABSTRACT: Linear terephthalamide polymers having h tensile modulus composed of recurring units having the str tural formula:

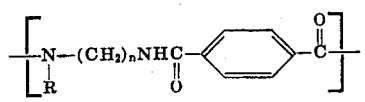

wherein $n$ is 2 or 3 and R is aryl.

POLYTEREPHTHALAMIDES OF N-ARYL-SUBSTITUTED SHORT CHAIN DIAMINES

This invention is directed to novel polyamides of terephthalic acid. More particularly, the invention relates to polyamides of the acid halide of terephthalic acid and N-aryl-substituted, short chain, aliphatic diamines.

The preparation of polyamides from the acid chloride of terephthalic acid and diamines is well known in the art. For instance, polyamides made from terephthaloyl chloride and short chain aliphatic, primary and secondary diamines have been described by Shashoua and Eareckson, J. Poly. Sci., 40 pp. 343–358 (1959). The N-aryl-substituted aliphatic diamines from which the polyamides of the invention are prepared are not disclosed, however. Likewise, polyamides of N-aryl-substituted aliphatic diamines and aliphatic dicarboxylic acids or complex petroleum acids are known, but are low melting. Also, polyamides of terephthaloyl chloride and unsubstituted and N,N'-diaryl substituted do not have particularly good solubility in common chlorinated hydrocarbon solvents and the melting points of the polyamides are quite high. Polyamides of N-alkyl and N,N'-dialkyl diamines, on the other hand, have relatively low glass transition temperatures ($Tg$) and melting points ($Tm$).

Another object of the invention is to provide polyamides having higher glass transition temperatures ($Tg$) and melting points than those made from N-alkyl and N,N'-dialkyl-substituted diamines.

Yet a further object of the invention is to provide shaped objects from these polyamides which objects exhibit unusually high tensile modulus.

These and other objects of the invention are obtained by a linear terephthalamide polymer composed of recurring units having the structural formula:

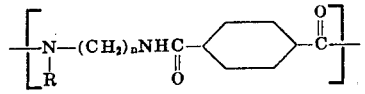

wherein $n$ is 2 or 3 and R is aryl, preferably phenyl which may be substituted, if desired, with nondeleterious substituents such as lower alkyl groups, (e.g., of one to five carbon atoms), halide groups such as chlorine and bromine groups, etc.

The novel polyamides to the invention may be prepared by reacting the diacid chloride of terephthalic acid with an N-aryl-substituted diamine. This reaction may be accomplished by adding the diacid chloride in a chlorinated hydrocarbon solvent, such as chloroform, methylene chloride and the like, to a rapidly stirred aqueous mixture of the N-aryl-substituted diamine. Equimolar amounts of the diamine and diacid halide are utilized and the reaction is effected in the presence of an acid acceptor which is preferably an inorganic alkali metal carbonate such as sodium or potassium carbonate. Organic acid acceptors such as triethylamine may also be used. The reaction proceeds rapidly at room temperature and is usually over in a matter of minutes. The resulting polymer is soluble in the chlorinated hydrocarbon solvent and may be separated therefrom by precipitation in a ketone such as acetone.

The N-aryl-substituted diamines useful as reactants in forming the polyamides of the invention having the structural formula:

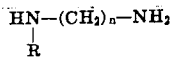

wherein R and $n$ have the values assigned above. Exemplary of suitable diamines are N-phenylethylenediamine, N-phenyltrimethylenediamine, N-p-tolyltrimethylenediamine, N-p-tolylethylenediamine, N-xylyltrimethylenediamine, N-p-chlorophenyltrimethylenediamine, N-p-bromophenylethylenediamine, N-p-ethylphenylethylenediamine, N-m-butylphenyltrimethylenediamine, N-naphthyltrimethylenediamine and the like. Mixtures of any two or more of these N-aryl-substituted diamines may also be employed, if desired.

The diacid chloride reactant of the invention may be entirely terephthaloyl chloride but, if desired, a mixture of terephthaloyl chloride and up to 25 mole percent of at least one diacid chloride of a dissimilar aromatic dicarboxylic acid may be employed so as to form copolymers. Examples of such diacid chlorides are the diacid chlorides of diphenic acid, 2,6-naphthalenedicarboxylic acid, sulfonyldibenzoic acid and isophthalic acid.

The polymers of the invention having an inherent viscosity of at least 0.4, often at least 0.6 and are capable of being formed into films, fibers and otherwise shaped into a variety of objects such as by conventional molding techniques, including injection-molding. If desired, additives commonly incorporated in polyamides, for example, stabilizers, reinforcing agents, antioxidants, pigments, dyes, optical brighteners, plasticizers and the like may also be added to the polymers of the invention.

The following examples are included to further illustrate the invention but not to be construed as limiting the invention in any way. The term "inherent viscosity" as used in this application refers to viscosity determinations made at 25° C. using 0.23 g. of polymer per 100 ml. of a solvent composed of 60 percent phenol and 40 percent tetrachloroethane. The glass transition temperatures ($Tg$) and the crystalline melting point ($Tm$) in the examples are measured by differential scanning calorimetry.

EXAMPLE I

Poly(N-phenyltrimethyleneterephthalamide)

A solution of 30 g. (0.0147 mole) terephthaloyl chloride in 250 ml. of chloroform is at one time added to a solution of 23.4 g. (0.0149 mole) N-phenyltrimethylenediamine and 31.8 g. (0.297 mole) sodium carbonate in 500 ml. of water in a Waring Blender. A mild exotherm is noted during the addition of the organic solution. After 20 minutes of stirring in the blender, the organic layer is separated and added dropwise to acetone in a Waring Blender. A fibrous, white solid precipitates and it is collected and dried. It melts with decomposition at 333° C. and has an inherent viscosity of 0.67. The $Tg$ is 152° C.

Molded Properties of Poly(N-phenyltrimethyleneterephthalamide)

(X–10794–80)

| | | |
|---|---|---|
| Tensile modulus p.s.i. × $10^5$ | | 4.8 |
| Tensile strength p.s.i. × $10^3$ | yld. | No |
| | brk. | 9.9 |
| Elongation % | | 15 |
| Notched Izod ft. lb./in. | | 0.16 |
| Heat distortion °C. 264 p.s.i. 0.2 defl. | | 141 |
| Molding Temp. °C. | | 260–270 |
| Molding Pressure p.s.i. | | 1200 |
| I.V. before | | 0.61 |
| after | | 0.63 |

Film Properties of Poly(N-phenyltrimethyleneterephthalamide)

(X–10794–52)

Cast from chloroform—methanol 80:20 by volume

| | | |
|---|---|---|
| Tensile modulus p.s.i. × $10^5$ | | 3.6 |
| Tensile strength p.s.i. × $10^3$ | yld. | No |
| | brk. | 8.9 |
| Elongation % | | 5.0 |
| Heat distortion °C., 50 p.s.i. | | 140 |

EXAMPLE II

Poly(N-phenylethyleneterephthalamide)

olution of 1.35 g. (0.0067 mole) terephthaloylchloride ml. of chloroform is added at one time to a vigorously mixture of 0.92 g. (0.00675 mole) N-phenlenediamine, 1.41 g. (0.0133 mole) sodium carbonate, water and 1 ml. of 10 percent aqueous DuPonol ME m lauryl sulfate) as an emulsifier. After 5 minutes of g the mixture is poured into acetone and the precipitate cted, washed thoroughly with water and dried. The T$m$ ° C. and the inherent viscosity is 0.42. The T$g$ is 175° C. cast from 80:20 chloroform-methanol is clear and can ased.

EXAMPLE III ixture of 22.4 g. (0.011 mole) terephthalolyl chloride 6 g. (0.0037 mole) isophthaloyl chloride is reacted with ;. (0.0149 mole) of N-phenyltrimethylenediamine in a er similar to example I. The resulting copolymer has 95° C. and T$g$=150° C. A film cast from 80:20 form-methanol is clear and can be creased.

EXAMPLE IV nixture of 1.03 g. (0.0050 mole) of terephthaloyl de and 0.042 g. (0.0017 mole) of the acid chloride of phthalene dicarboxylic acid is reacted with 0.92 g. ;75 mole) of N-phenylethylenediamine in a manner r to example II. The resulting copolymer has T$m$=315° d T$g$=167° C. A film cast from 80:20 chloroform- nol is clear and can be creased.
claim:

1. A linear terephthalamide film and fiber forming polymer composed of recurring units having the structural formula:

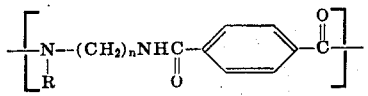

wherein $n$ is 2 or 3 and R is aryl.

2. The linear terephthalamide polymer of claim 1 wherein R is phenyl.
3. A film or molded article of the polymer of claim 1.
4. A film or molded article of the polymer of claim 2.
5. A substantially linear copolymer consisting essentially of the polycarbonamide condensation product of a diamine having the structure:

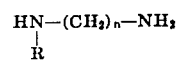

wherein R is aryl and $n$ is 2 or 3 and a diacid halide, said diacid halide comprising a mixture of terephthaloyl chloride and up to 25 mole percent of a least one diacid chloride of a dissimilar carbocyclic aromatic dicarboxylic acid.

6. The substantially linear copolymer of claim 5 wherein R is phenyl, $n$ is 2 and the dissimilar aromatic dicarboxylic acid is isophthalic acid.
7. The substantially linear copolymer of claim 5 wherein R is phenyl, $n$ is 3 and the dissimilar aromatic dicarboxylic acid is isophthalic acid.
8. A film or molded article of the polymer of claim 5.
9. A film or molded article of the polymer of claim 6.
10. A film or molded article of the polymer of claim 7.
11. A film or molded article of the polymer of claim 8.

* * * * *